(12) United States Patent
Ito et al.

(10) Patent No.: US 8,145,829 B2
(45) Date of Patent: Mar. 27, 2012

(54) FLASH MEMORY DEVICE CAPABLE OF PREVENTING READ DISTURBANCE

(75) Inventors: Takafumi Ito, Ome (JP); Hiroyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 405 days.

(21) Appl. No.: 12/393,553

(22) Filed: Feb. 26, 2009

(65) Prior Publication Data

US 2009/0282187 A1    Nov. 12, 2009

(30) Foreign Application Priority Data

May 12, 2008    (JP) ................. 2008-125127

(51) Int. Cl.
*G06F 12/00*    (2006.01)

(52) U.S. Cl. ........................................ 711/103
(58) Field of Classification Search ............... None
See application file for complete search history.

(56) References Cited

FOREIGN PATENT DOCUMENTS

JP    11-134255    5/1999

*Primary Examiner* — Brian Peugh
(74) *Attorney, Agent, or Firm* — Oblon, Spivak, McClelland, Maier & Neustadt, L.L.P.

(57) ABSTRACT

A storage has a first cache area temporarily storing one page data read from a flash memory, and a second cache area to which data of the first cache area is transferred. A controller stores data of the first cache area in the second cache area, and reads and outputs the data stored in the second cache area when data having the same address as data read from the first cache area is read.

18 Claims, 4 Drawing Sheets

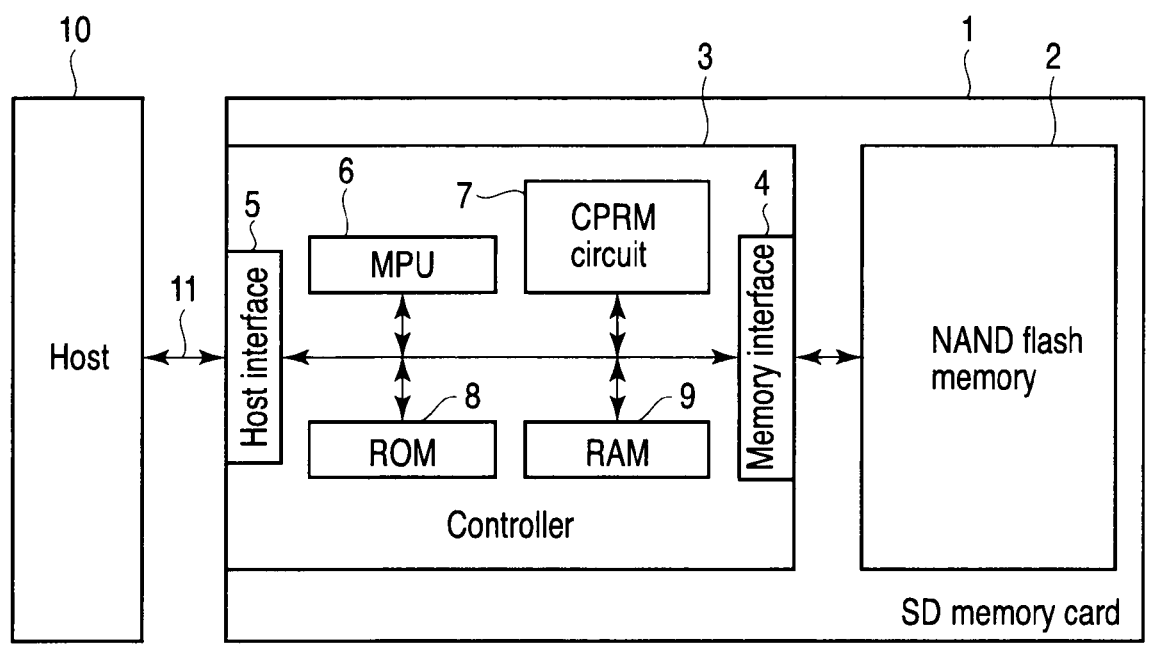
F I G. 1

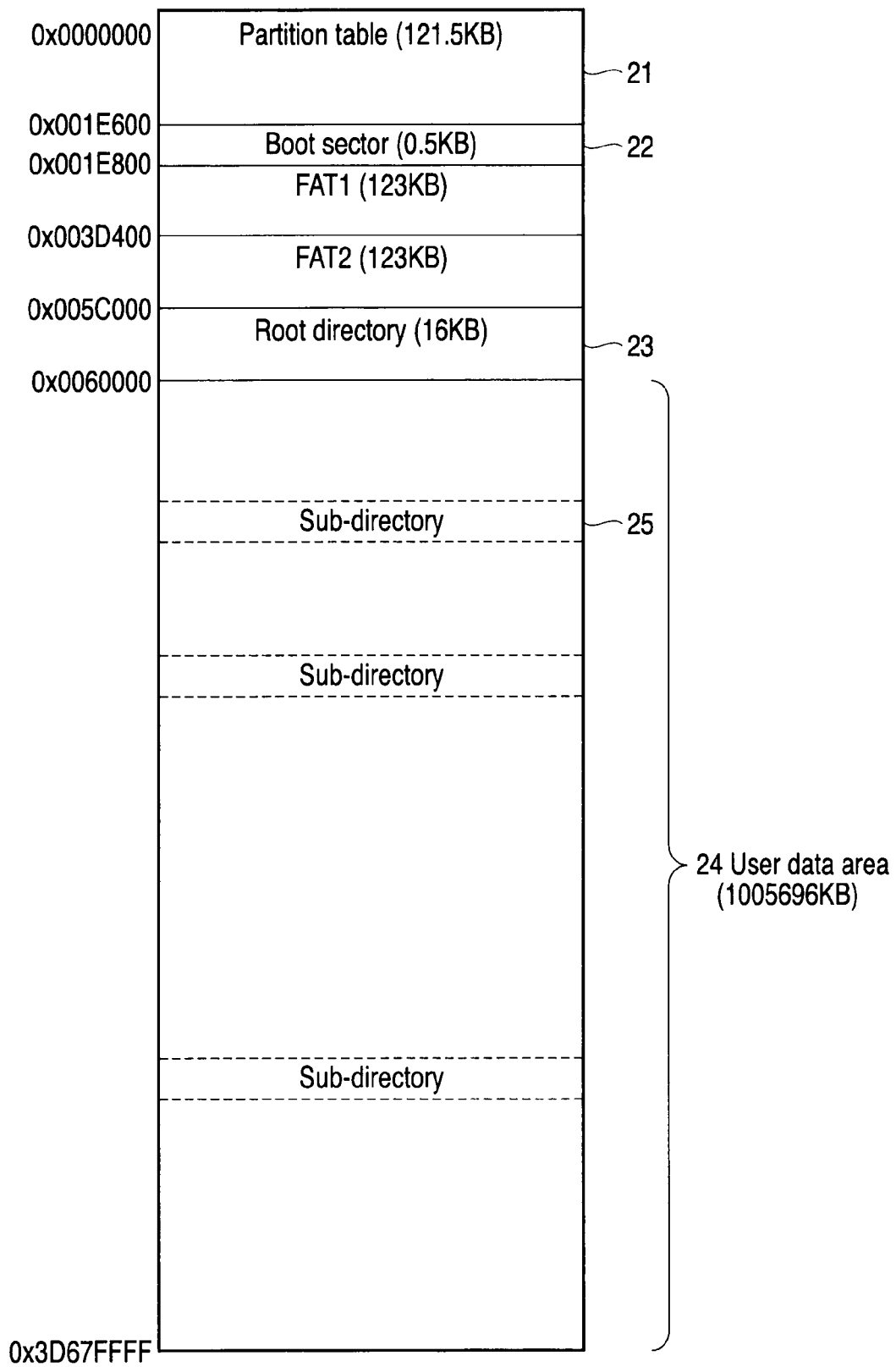
F I G. 2

FLASH MEMORY DEVICE CAPABLE OF
PREVENTING READ DISTURBANCE

CROSS-REFERENCE TO RELATED APPLICATIONS

This application is based upon and claims the benefit of priority from prior Japanese Patent Application No. 2008-125127, filed May 12, 2008, the entire contents of which are incorporated herein by reference.

BACKGROUND OF THE INVENTION

1. Field of the Invention

The present invention relates to a flash memory device. For example, the present invention relates to a control system for an SD™ memory card using a NAND flash memory.

2. Description of the Related Art

For example, a NAND flash memory used for an SD memory has the following problem. Specifically, the same address data is repeatedly read at a very high frequency, and thereby, there exists a phenomenon (read disturbance [RD]) such that data stored at the address is destroyed.

For example, according to a file allocation table (FAT) system, management information such as FAT and directory entry are repeatedly read when data is accessed depending on host apparatus characteristics.

Specifically, every time cluster data of a file is read, a FAT corresponding to the cluster is frequently read at a small data size (e.g., 512 bytes). For example, according to a FAT16 having a cluster size of 16 Kbytes, a 512-byte FAT area has 256 FAT data. If a 4 Mbytes (256 clusters) file is assigned to a continuous cluster, when the corresponding FAT data is read every time one cluster data is read, the 512-byte FAT area data is read 256 times while a file is read. If the foregoing read operation is carried out with respect to the same page of a NAND flash memory, the number of page reads becomes great; as a result, the risk of generating RD increases. In other words, in the NAND flash memory, data read/write are carried out at a page unit. For this reason, if the 512-byte FAT area data is stored in one page, the same page is accessed 256 times.

A file entry is a 32-byte data block stored with a file name to a file, a start cluster address of the file and a file size. In the file entry, the same data is repeatedly read every time the file is accessed. Therefore, if the file entry is read from the same page of the NAND flash memory, the number of page reads becomes great; as a result, the risk of generating RD increases. Accordingly, it is desired to provide a flash memory device capable of effectively preventing data destruction by read disturbance.

It should be noted that, although a technique of preventing RD is not provided, a hard disk file management system has been known as the related art (e.g., see Jpn. Pat. Appln. KOAKI Publication No. 11-134255).

BRIEF SUMMARY OF THE INVENTION

According to a first aspect of the invention, there is provided a flash memory device comprising: a flash memory; a storage having first and second cache areas, the first cache area temporarily storing data equivalent to at least one page read from the flash memory, the second cache area stored with data of the first cache area; and a controller storing data of the first cache area in the second cache area, and reading and outputting the data stored in the second cache area when data having the same address as data read from the first cache area is read.

According to a second aspect of the invention, there is provided a data read method comprising: receiving a first command for reading data, the first command including a read address; and outputting data stored in a second cache area when data read from a flash memory to a first cache area and the address included in the first command is the same, the data of the second cache area being transferred from the first cache area.

BRIEF DESCRIPTION OF THE SEVERAL VIEWS OF THE DRAWING

FIG. 1 is a block diagram showing the configuration of an SD memory card given as a flash memory device to which this embodiment is applied;

FIG. 2 is a view showing a logical memory map of the SD memory card shown in FIG. 1;

DETAILED DESCRIPTION OF THE INVENTION

Figure 3:
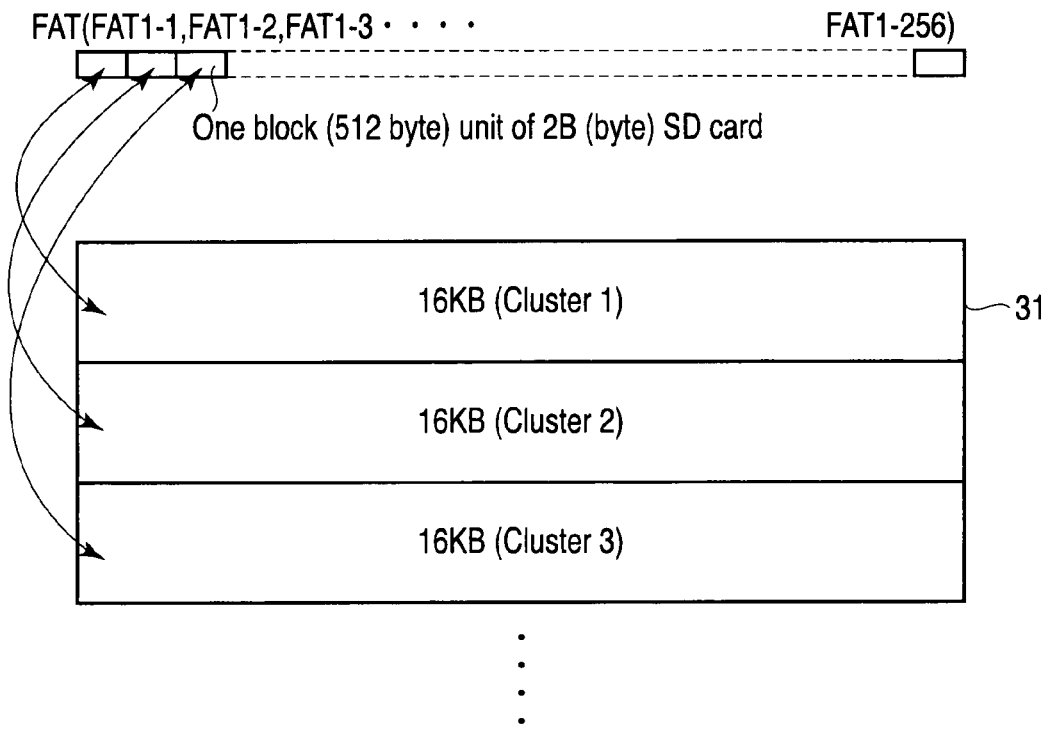
FIG. 3 is a view to explain the relationship between a FAT and a cluster.

Various embodiments of the present invention will be hereinafter described with reference to the accompanying drawings.

FIG. 1 shows the configuration of an SD memory card given as a flash memory device to which this embodiment is applied. An SD memory card 1 has a NAND memory (NAND flash memory) 2 and a controller 3. The controller 3 has a memory interface 4, a host interface 5, a microprocessor unit (MPU) 6, a content protection for recordable media (CPRM) circuit 7, a read-only memory (ROM) 8 and a random access memory (RAM) 9.

The memory interface 4 executes an interface processing between the controller 3 and the NAND memory 2. The host interface 5 executes an interface processing between the controller 3 and the host 5.

The ROM 8 is a memory stored with control programs used by the MPU 6. The RAM 9 is a nonvolatile memory, which is used as a work area and a cache for the MPU 6 and stored with various tables, for example, a static RAM (SRAM).

The MPU 6 controls the operation of the memory card 1. For example, when power is supplied to the SD memory card 1, the MPU 6 starts a processing according to firmware (control program) stored in the ROM 8. Specifically, the MPU 6 creates various tables (management data) required for processings on the RAM 9. The MPU 6 further accesses the corresponding area on the NAND memory 2 when receiving write command, read command and erase command. The MPU 6 further converts a logical address from the host into a physical address to access the NAND memory 2, and controls data transfer.

According to this embodiment, one page (data read and write unit) of the NAND memory 2 is 4 Kbytes, for example. In the SD card, data read and write are executed at a block unit; in this case, one block is set to 512 bytes. Specifically, according to one read command or write command, read or write is executed with respect to a logical address=512×m (m: integer) at a 512×n (n: integer) byte unit.

FIG. 2 shows a FAT format logical memory map of an SD memory card to which this embodiment is applied. In the memory card, a FAT format parameter is determined for each capacity according to the SD standard. For example, if the SD card has a capacity of 1 GB, FAT1 and FAT2 addresses are determined.

A partition area 21 is an area for storing a partition table including partition information. A boot area 22 is an area for storing boot information. FAT1 an FAT2 are stored with management information for managing whether a file to be written is divided and stored to which cluster. The foregoing FAT1 and FAT2 are stored with the same data. This is because if defect occurs in one FAT, data is restorable using the other FAT. FAT1 and FAT2 store cluster information assigned to a file, and further, store the cluster link relationship of a storage. Information stored in FAT1 and FAT2 is traced, and thereby, the file is restorable to the original file.

A root directory entry area 23 stores root directory entry information. If a sub-directory 25 is created at the underlying hierarchy of a root directory, the sub-directory is created in a user data area 24. The root directory has a fixed address; however, a file entry of the sub-directory is settable at an optional logical address.

FIG. 3 shows the relationship between FAT and a cluster. In a FAT file system, a cluster address written in the FAT shows which cluster a file is stored. According to the FAT of the SD standard, one cluster 31 is 16 KB, and a cluster address for each 16 KB is shown by a 2-byte (16 bits) FAT. For this reason, for example, a 512-byte FAT has 256 FATs (1-1 to 1-256).

Figure 4:
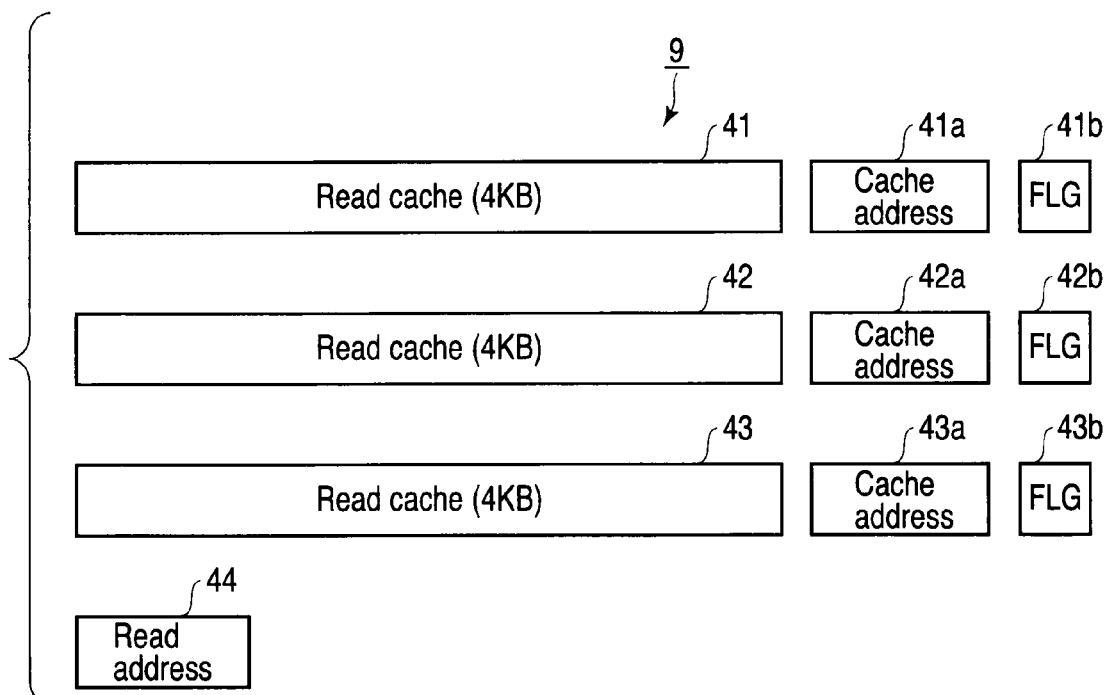
FIG. 4 is a view showing a read cache according to the present embodiment.

FIG. 4 shows a read cache storage area secured by the RAM 9 shown in FIG. 1. The storage area has read caches 41, 42 and 43 each having a capacity of 4 KB. The read cache 41 is a cache for temporarily storing data equivalent to one page (4 KB) read from the NAND memory 2. Read caches 42 and 43 store data stored in the read cache 41 according to each condition described later. The read cache 42 is a cache for storing FAT data, and the read cache 43 is a cache for storing a file entry.

Cache address storages 41a, 42a and 43a are provided correspondingly to read caches 41, 42 and 43. These cache address storages 41a to 43a store address of data stored in the read caches 41 to 43.

Flag storages 41b, 42b and 43b are provided correspondingly to read caches 41, 42 and 43. These flag storages 41b to 43b store data showing whether or not data is stored in read caches 41, 42 and 43. When valid data exists in the cache, data "1" is written. Conversely, when no valid data exists in the cache, data "0" is written.

A storage 44 for temporarily storing read address is further provided.

The read cache 41 has a function as a buffer memory, and one page read from the NAND memory 2 is first stored in the read cache 41. An address corresponding to the data is stored in the cache address storage 41a, and then, data "1" is written to the flag storage 41b. Data stored in the read cache 41 is read from the host, and transferred to the read cache 42 or 43. The foregoing operation is controlled according to the following read command.

(Explanation About the Operation)

Figure 5:
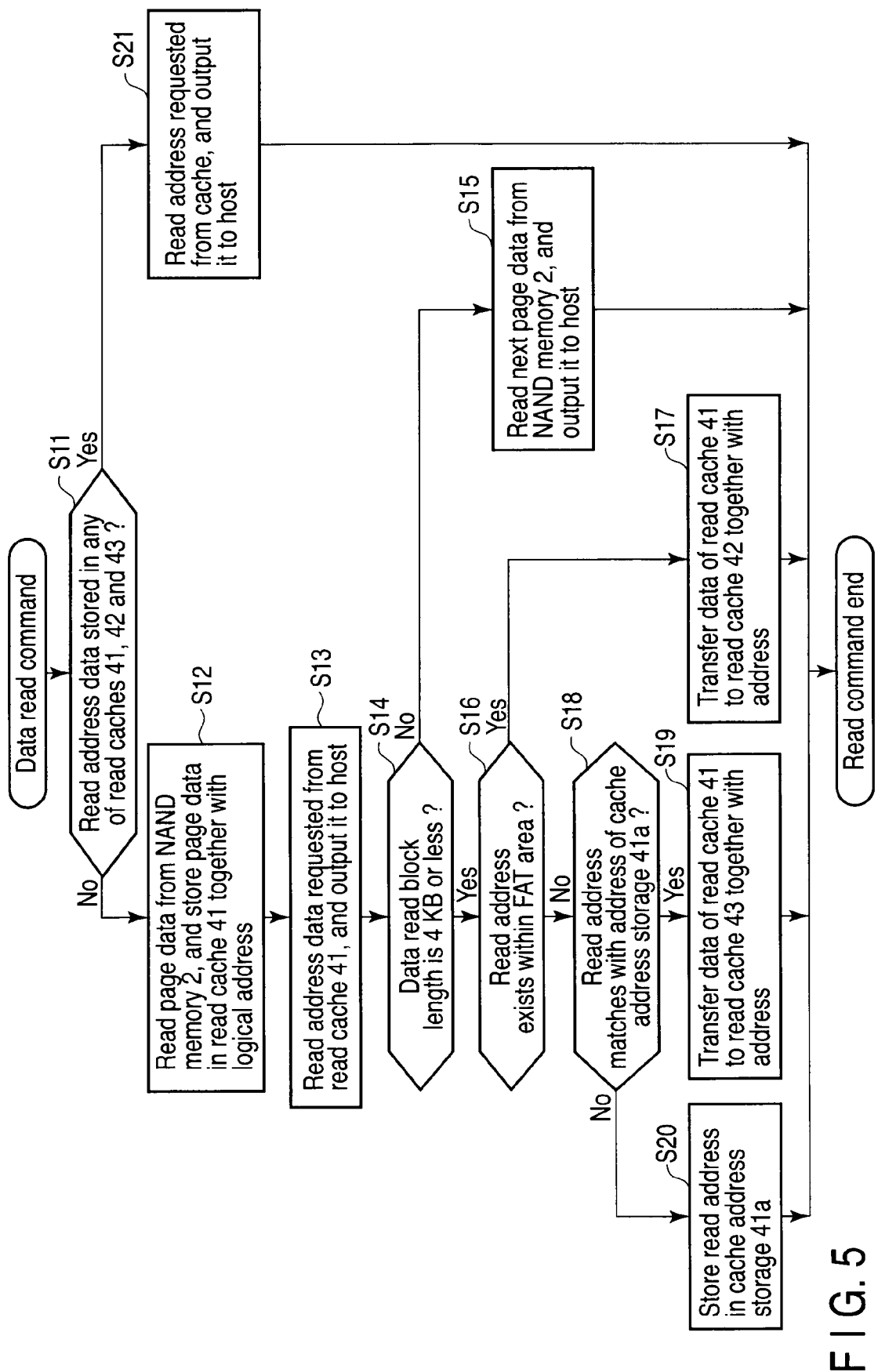
FIG. 5 is a flowchart to explain the operation of the present embodiment.

FIG. 5 is a flowchart to explain the data read operation by the controller 3, that is, MPU 6.

In a data read operation, the host 10 issues a read command. The read command includes a read address and a data length. When receiving the read command issued from the host 10, the MPU 6 of the SD memory card 1 determines whether or not valid data is stored in any of read caches 41, 42 and 43 of the RAM 9 (S11).

Specifically, the MPU 6 determines whether or not valid data is stored in the flag storage 41b corresponding to the read cache 41. As a result, if data "1" showing that valid data is stored is stored, a comparison is made between an address stored in the cache address storage 41a and a read address requested by the read command. The foregoing comparison is made; as a result, if the foregoing two addresses do not match, the MPU 6 determines whether or not valid data is stored in the flag storage 42b corresponding to the read cache 42. As a result, if data "1" showing that valid data is stored is stored, a comparison is made between an address stored in the cache address storage 42a and a read address requested by the read command. The foregoing comparison is made; as a result, if the foregoing two addresses do not match, the MPU 6 determines whether or not valid data is stored in the flag storage 43b corresponding to the read cache 43. As a result, if data "1" showing that valid data is stored is stored, a comparison is made between an address stored in the cache address storage 43a and a read address requested by the read command.

As a result, if these addresses do not match, the MPU 6 reads address data designated by the command from the NAND memory 2, and then, temporarily stores the data in the read cache 41 (S12). The read data is further read from the read cache 41, and thereafter, transferred to the host 10 (S13). In this case, the cache address storage 41a and the read address storage 44 is stored with address included in the read command.

The MPU 6 determines whether or not a data length included in the command is 4 KB or less (one page) (S14). In other words, it is determined whether or not data read one time is more than 4 KB. As a result, if the data length is more than 4 KB, the remaining data is continuously read from the next page address of the NAND memory 2, and then, output to the host in the same manner as above (S15).

Conversely, if the data length is 4 KB or less, it is determined whether or not the read address (read start logical address) exists within a FAT area, that is, the read address shows that it exists in FAT1 or FAT2 (S16). As a result, if the read address exists in the FAT area, data of the read cache 41 is transferred to the read cache 42, and then, the address of the cache address storage 41a is transferred to the cache address storage 42a (S17).

Conversely, if the read address does not exist in the FAT area, it is determined whether or not the read address matches with the address stored in the cache address storage 41a (S18). As a result, if the foregoing two addresses match, the address of the cache address storage 41b is transferred to the cache address storage 43b (S19). Namely, it is determined that the read operation at this time is made with respect to fail entry, and then, the data of the read cache 41 is transferred to the read cache 43.

The determination is made in step S18; as a result, if the read address does not match the address stored in the cache address storage 41a, the read address is stored in the cache address storage 41a (S20). It should be noted that this operation is executed in a read operation after the second time.

Thereafter, when the host 10 issues the following read command, it is determined in step S11 whether or not valid data is stored in any of read caches 41, 42 and 43 in the same manner as above (S11). As a result, if valid data is stored, a comparison is made between address stored in the cache address storage of the read cache stored with the valid data and address of the read command. If the foregoing two addresses match, data is read from the corresponding read cache, and thereafter, transferred it to the host 10 (S21).

According to the foregoing operation, data read less than 4 KB is executed with respect to the same address twice in the FAT area or out of the FAT area. In this case, data is read from the read cache 42 or 43, and is not read from the NAND memory 2.

For example, if the following read access patterns are generated from the host 10, data in the FAT area is read from the read cache 42, and is not read from the NAND memory 2.

(1-1) When the host 10 issues a command of instructing to read FAT1-1 (512 B) shown in FIG. 3, data of FAT1-1, FAT1-2, FAT1-3, . . . is stored in read caches 41 and 42.

(1-2) When the host 10 issues a command of instructing to read a cluster 1 (16 KB) shown in FIG. 3, data of the cluster 1 is stored in the read cache 41. In this case, the read cache 42 holds data of FAT1-1, FAT1-2, FAT1-3, . . . , FAT1-256.

(1-3) When the host 10 issues a command of instructing to read FAT1-2 (512 B) shown in FIG. 3, FAT1-2 is read from the read cache 42.

(1-4) When the host 10 issues a command of instructing to read a cluster 2 (16 KB) shown in FIG. 3, data of the cluster 2 read from the NAND memory 2 is temporarily stored in the read cache 41, and then, data is transferred from the read cache 41 to the host 10.

As described above, when FAT area read is executed, data equivalent to one page read from the NAND memory 2 is stored in the read cache 41, and further, transferred to the read cache 42. Thereafter, when FAT area read is again instructed, the data is read from the read cache 42, and is not read from the NAND memory 2. Therefore, it is possible to prevent data of the FAT area of the NAND memory 2 from continuously read. This serves to prevent RD of the FAT area.

When data less than 4 KB is read from the NAND memory 2 except FAT area, one page data including the foregoing data is stored in the read cache 41, and further, transferred to the read cache 43. For example, if the following read access patterns are generated from the host 10, file entry data is read from the read cache 43, and not the NAND memory 2.

(2-1) The host 10 issues a command of instructing to read a file entry (512 B).

(2-2) When the host 10 issues a command of instructing to read data of a cluster 1 (16 KB), the read cache 41 is stored with one page data read from the cluster 1.

(2-3) When the host 10 issues a command of instructing to read the same file entry (512 B) as the foregoing (2-1), read less than 4 KB and other than FAT is generated twice. For this reason, the file entry data stored in the read cache 41 is transferred to the read cache 43.

(2-4) When the host 10 issues a command of instructing to read FAT and a cluster 2 (16 KB), one page data read from the cluster 2 is stored in a read cache 0.

(2-5) When the host 10 issues a command of instructing to read the same file entry (512 B) as the foregoing (2-1), the data is read from the read cache 43.

According to the foregoing operation, even if data less than 4 KB is continuously read except the FAT area, data after the second time is read from the read cache 43. Therefore, the number of times of reading the NAND memory 2 is reduced, and thus, this serves to prevent the foregoing RD.

In addition, the foregoing configuration and processing are provided, and thereby, a capture method to the read cache is changed in accordance with access characteristics from the host. In this way, read disturbance can be effectively prevented without requiring a large capacity of the RAM.

If data write is generated with respect to the address corresponding to data stored in a certain read cache, the data of the read cache becomes invalid. In other words, the foregoing read cache is opened, and then, data "0" is stored in a flag storage of the read cache.

(Modification Example)

The following special commands may be provided in order to expand the function.

(Read Command with Forced Read Cache)

According to this embodiment, the operation of a normal read command is given as the flowchart shown in FIG. 5. Therefore, the data of the read cache 41 is not transferred to the read cache 42 or 43 so long as a specific condition, that is, the following condition is not established. According to the condition, the same address is continuously accessed, and the data length is less than 4 KB.

In view of the foregoing circumstances, a "read command with forced transfer" is provided independently from the normal read command. According to the "read command with forced transfer", data is forcedly transferred from the read cache 41 to the read cache 42 or 43. The "read command with forced transfer" is provided with a bit for designating a read cache as a read command argument. When the foregoing read command is issued, the data of the read cache 41 is unconditionally transferred to the designated read cache 42 or 43. The "read command with forced transfer" is usable in the case where the host has need to repeatedly read specified data such as FAT and file entry.

(Read Command with no Forced Transfer)

The operation of a normal read command is given as the flowchart shown in FIG. 5. Therefore, when the foregoing specified condition is established, the data of the read cache 41 is necessarily transferred to the read cache 42 or 43.

In view of the foregoing circumstances, a "read command with no forced transfer" is provided independently from the normal read command. The "read command with no forced transfer" is provided with a bit showing no forced transfer as a read command argument. When the "read command with no forced transfer" is issued, the data of the read cache 41 is not transferred to the read cache 42 or 43 even if the foregoing specified condition is established. The "read command with no forced transfer" is used for the case where it is desired not to release FAT and file entry data already cached by the host from the read cache 41.

(Read Cache Release Command)

A "read cache release command" is a command for making invalid data of all read caches 41 to 43. When the foregoing command is issued, all read caches is made invalid, and then, each data of flag storages 41b, 42b and 53b is set to "0".

This embodiment relates to the SD card to which the present invention is applied. However, the present invention is not limited to the foregoing embodiment. The present invention is applicable to other semiconductor memory card having the same bus interface as the SD card and a semiconductor memory device.

According to this embodiment, read caches 41, 42 and 43 comprise a volatile RAM, for example, SRAM. However, the present invention is not limited to the foregoing SRAM. For example, a nonvolatile FeRAM (ferroelectric memory) may be used. In this case, even if the power of the device is turned off, data of read caches is held. Therefore, the power is turned on, and thereafter, if read to data cached before the power is turned off is generated; the data is read from a FERAM without reading it from the NAND memory 2. In this way, RD is prevented, and in addition, high-speed read is achieved.

The capacity of each read cache is set to one page of the NAND memory 2. However, if much of the capacity of the RAM is used, the capacity of each read cache may be set to two pages.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flash memory device comprising:
a flash memory;
a storage including first and second cache areas, the first cache area temporarily storing data equivalent to at least one page read from the flash memory, the second cache area stored with data of the first cache area; and
a controller configured to store data of the first cache area into the second cache area when an address of the data stored in the first cache area is the same as an address for reading data from the flash memory, and to read and output the data stored in the second cache area without reading data from the flash memory.

2. The device according to claim 1, wherein the data is file management data.

3. The device according to claim 1, wherein the second cache area has a plurality of conditions for storing data.

4. The device according to claim 3, wherein the conditions include a data length included in a read command supplied from a host.

5. The device according to claim 4, wherein the conditions include a logical address of the data read from a read command supplied from the host.

6. The device according to claim 1, further comprising:
a third cache area stored with data of the first cache area.

7. The device according to claim 6, wherein the second cache area stores file allocation table (FAT) data, and the third cache area stores a file entry.

8. The device according to claim 7, further comprising:
a first cache address storage storing an address of data stored in the first cache area;
a second cache address storage storing an address of data stored in the second cache area; and
a third cache address storage storing an address of data stored in the third cache area.

9. The device according to claim 8, further comprising:
a first flag storage storing a flag showing whether or not data stored in the first cache area is valid;
a second flag storage storing a flag showing whether or not data stored in the second cache area is valid; and
a third flag storage storing a flag showing whether or not data stored in the third cache area is valid.

10. A data read method comprising:
receiving a first command for reading data from a flash memory, the first command including a read address; and
transferring data stored in a first cache area into a second cache area when an address of data stored in the first cache area is the same as the read address included in the first command, and wherein the data of the second cache area is output without reading data from the flash memory.

11. The method according to claim 10, wherein the data is file management data.

12. The method according to claim 10, wherein the second cache area has a plurality of conditions for storing data.

13. The method according to claim 12, wherein the conditions include a data length included in a read command supplied from a host.

14. The method according to claim 13, wherein the conditions include a logical address of the data read from a read command supplied from the host.

15. The method according to claim 10, further comprising:
a second command for transferring data of the first cache area to the second or a third cache area.

16. The method according to claim 14, further comprising:
a third command for making no transfer of data of the first cache area to the second or a third cache area even if the condition is included.

17. The method according to claim 10, further comprising:
a fourth command for making invalid data of the first cache area to a third cache area.

18. The method according to claim 10, wherein the second cache area stores file allocation table (FAT) data, and a third cache area stores a file entry.

* * * * *